Sept. 25, 1928.                                          1,685,695
                    C. J. V. FÉRY
        SEPARATING DEVICE FOR LEAD STORAGE BATTERIES
              Filed May 18, 1926        2 Sheets-Sheet 1
Fig.1.                                  Fig.3.
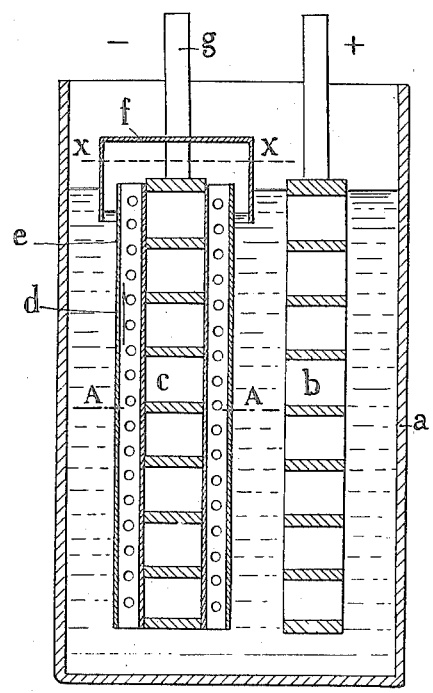
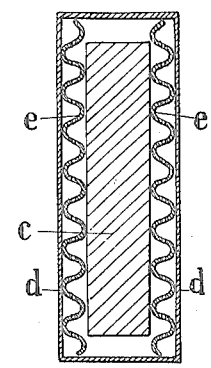
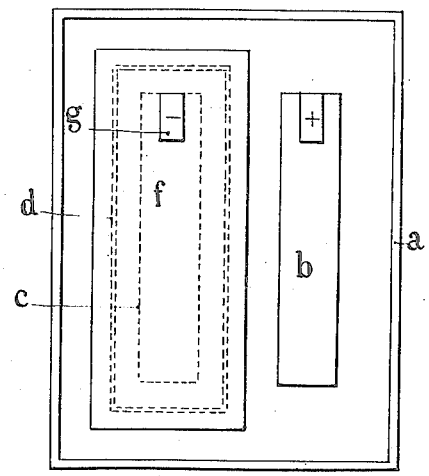
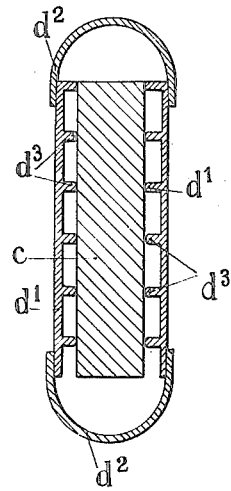
Fig.2.
Fig.4
C. J. V. Féry, Inventor
By: Marko & Clark
   Attys Sept. 25, 1928.

C. J. V. FÉRY 1,685,695

SEPARATING DEVICE FOR LEAD STORAGE BATTERIES

Filed May 18, 1926     2 Sheets-Sheet 2

C. J. V. Féry, Inventor

By: Marks & Clerk
Attys

Patented Sept. 25, 1928.

1,685,695

UNITED STATES PATENT OFFICE.

CHARLES JEAN VICTOR FÉRY, OF PARIS, FRANCE.

SEPARATING DEVICE FOR LEAD STORAGE BATTERIES.

Application filed May 18, 1926, Serial No. 110,035, and in France May 25, 1925.

In lead storage batteries, the electrolyte encloses oxygen the presence of which is due, on the one hand, to the contact of the electrolyte with the outer air the oxygen of which dissolves at the surface of this electrolyte and, on the other hand, to the evolution of oxidizing bodies which are diffused in the mass of the electrolyte by the active material of the positive plates, when it slowly decomposes.

The simultaneous action of the electrolyte and of the oxygen it contains, upon the negative plates of lead storage batteries has for effect of producing a loss of charge of the latter when they are in open circuit and, besides, the sulphation of these storage batteries when they are left to rest after discharge.

It has been proposed to protect the negative plates of lead storage batteries against the oxidizing products evolved by the positive plates, by diaphragms or separating devices, but the devices used up to this day ensure but an imperfect protection, as they form only a partial obstruction to the passage of the oxidizing products evolved by the positive plates and cannot prevent the oxygen of the air having access to the negative plates.

The present invention has for object an improvement in lead storage batteries and consisting in the application of a separating device adapted to ensure the protection of the negative plates, on the one hand, against the oxidizing products evolved by the positive plates and on the other hand, against the oxygen of the air for the purpose of maintaining the charge of these storage batteries, when they are at rest, and of preventing their sulphation.

Moreover, by its special constitution, this separating device allows an easy circulation of the electrolyte about the negative plates and thus prevents the stagnation of the exhausted liquid about the negative plates which stagnation causes in the case of very intense outflows, for instance in the case of the starting of motor cars, the polarization of the storage battery.

The separating device, forming the subject-matter of the invention, is characterized by the two following points.

(a) the protection of each negative plate against the oxidizing products evolved by the positive plates, by means of a sheath which is impervious to gases and completely surrounds the negative plate; besides, this sheath is open at both ends so as to permit, on the one hand, the circulation of the electrolyte in the space reserved between the said sheath and the negative plate and, on the other hand, the evacuation of the hydrogen which evolves on each of the negative plates during charging.

(b) The arrangement above the negative plates of a protector so devised as to prevent the access of the oxygen of the outer air upon the upper part of these plates, whilst permitting the evacuation to the exterior of the hydrogen which evolves on the said plates.

Several forms of carrying out the invention will be described hereinafter, by way of example, with reference to the accompanying drawing in which:

Figs. 1 to 3 illustrate a form of carrying out the invention applied to a storage battery element having two plates; Fig. 1 shows the storage battery element in cross vertical section; Fig. 2 is a plan view; Fig. 3 is a horizontal section made according to line A—A of Fig. 1.

Fig. 4 is a horizontal section of a modification.

Figure 5:
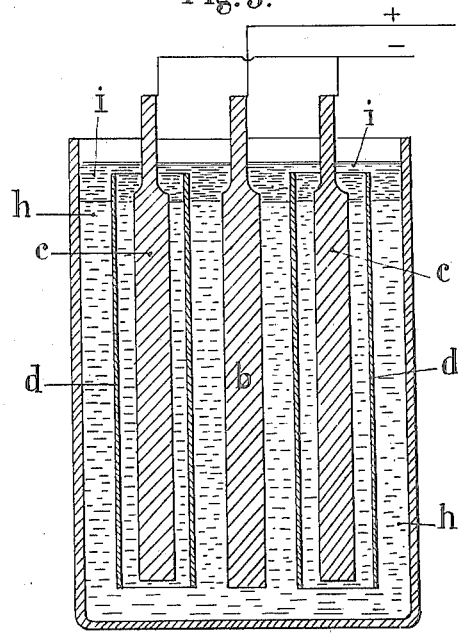
Fig. 5 illustrates in cross vertical section another form of construction applied to a storage battery with free electrolyte.

As shown in Figs. 1 to 3, the storage battery element comprises a vessel $a$ containing two plates: a positive plate $b$ and a negative plate $c$ constituted in the ordinary manner, and the electrolyte in which these plates are placed.

The negative plate $c$ is completely surrounded by a sheath $d$ constituted, for instance, by a sheet of parchment paper or of pure cellulose chemically prepared, such as that used for the manufacture of artificial silk, or by any other spongy material having sufficiently small pores so that after imbibition of the liquid it should be impervious to gases.

The sheath $d$ is open at both ends.

An interval is reserved between the faces of the negative plate $c$ and the sheath $d$ for the free circulation of the electrolyte; this interval is maintained by any suitable device, for instance by the interposition, between each of the faces of the plate $c$ and sheath $d$, of a waved perforated sheet e, made of insulating material and on which the said sheath d is stretched.

The upper part of the sheath d is covered by a bell f entering the electrolyte so as to constitute a liquid joint about this sheath, this bell, which can be made of insulating material, such as ebonite or celluloid, is carried, for instance, by the tail end g of the plate c.

By means of this device, at the end of the charging of the storage battery, the hydrogen, which evolves at the negative electrode, is collected under the bell f and can subsequently be freely evacuated through the interval existing between the lower edge of this bell and the periphery of the upper part of the sheath d; it results therefrom that after charging the electrolyte, which surrounds the negative plate, is covered with hydrogen which disappears gradually, as noticed by the inventor during the discharge by dissolving in this electrolyte. In these conditions the negative plate is completely protected against the oxygen of the air.

Besides, the sheath prevents the oxygen bubbles which slowly evolve from the positive plate from having access to this negative plate.

Finally, during discharge, when the electrolytic liquid rises above the upper edge of the sheath d, for instance up to the level X—X, a circulation of this electrolyte is produced, owing to the diminution of density of the electrolyte during discharge, in the direction of the arrows shown in Fig. 1, in the free space comprised between the plate c and the sheath d; this causes a constant admission of fresh liquid on to the negative plate c, this liquid entering through the lower open end of the sheath d.

From the foregoing it will be seen that this separating device completely prevents the admission of oxygen on to the negative plate, and that the bell f, closed at its lower part by a liquid joint, operates as a valve preventing the entrance of the outer air into the space situated above the plate c, and permitting the issue of the hydrogen evolving from the negative electrode during charging.

Fig. 4 shows in horizontal section, a modification in which the separating sheath is constituted by two wooden partitions $d^1$ similar to those used in starting batteries for motor cars, and two side couplings made of ebonite, celluloid or any other suitable material, fitting on these two partitions $d^1$.

The walls $d^1$ are provided, on their inner face, with ribs $d^3$ adapted to maintain, between the said partitions and the negative plate c, the interval permitting the circulation of the electrolytic liquid surrounding this plate, as previously explained.

The side couplings $d^2$ are glued upon the partitions $d^1$, for instance by a celluloid glue, so as to ensure the closing of the sheath on its sides.

This separating sheath is covered, as previously stated, by a bell preventing access of the oxygen of the air and retaining the hydrogen during charging, whilst permitting the evacuation of the excess of this gas.

In the form of construction illustrated in Fig. 5, each of the negative plates c is completely surrounded, as above stated, by a sheath d constituted, for instance, by a sheet of parchment paper or of pure cellulose chemically prepared, or by any other spongy material having sufficiently fine pores so that after imbibition of the liquid it should be impervious to gases.

This sheath d, open at both ends, emerges at its upper part above the level of the electrolyte h.

Above this electrolyte h floats a layer of heavy oil i, the level of which is above the upper end of the sheath d surrounding the negative plates.

This layer of oil i prevents access of the air in the electrolyte and to the upper part of the negative plates c, whilst permitting the evacuation of the gases which evolve from the electrodes; the hydrogen which evolves from the negative plates, during charging, rises through the electrolyte in the free space reversed between each of these plates and its separating sheath, then passes through the layer of heavy oil i and escapes into the air; likewise, the oxygen evolving from the positive plate b escapes through the layer of oil i without coming in contact with the negative plates c protected by their sheath d.

This method of carrying out the invention, which is of a very simple construction, is particularly applicable to stationary storage batteries.

Figure 6:
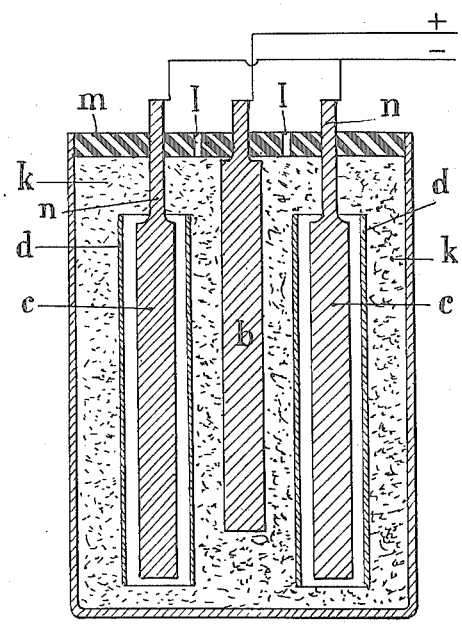
Fig. 6 shows, also in cross vertical section, another mode of construction applied to a storage battery in which the electrolyte is immobilized.

In the form of construction illustrated in Fig. 6 which relates to a storage battery in which the electrolyte is immobilized, the negative electrodes c surrounded by their separating sheaths d, as previously stated, are arranged at a level lower than that of the positive electrode b so that the upper part of each of the negative plates is covered with a layer of immobilizing material k sufficiently thick for preventing access of the air which might enter through the orifices l provided in the insulating obturating layer m and adapted to prevent the evacuation of the gases evolving within the storage battery.

For avoiding the action of oxygen upon the tail ends of the negative plates n, which are not protected by the separator d, it is convenient to varnish these tail ends with a varnish which is not attacked by the acid, or to cover them with a rubber tube.

As in the preceding cases, the separating sheaths d, open at both ends, permit the circulation of the electrolyte along the walls of the negative plates c and prevent any lateral access upon the latter of the oxygen evolved from the positive plate $b$.

Moreover, the layer of immobilizing material interposed between the positive plate $b$ and the sheaths $d$ prevents any direct contact of this plate with the said sheaths and, consequently, any risk of deterioration of the latter.

Finally, the layer of immobilizing material situated below the positive plate $b$ retains the active material falling from this plate and prevents this falling active material from reaching the lower opening of the sheaths $d$ surrounding the negative plates $c$.

This type of storage battery, which is easily transportable, without risk of projection of acid, is particularly applicable on vehicles, either for traction or lighting purposes.

The above described devices are applicable to all systems of lead storage batteries having vertical plates, whatever may be the number of positive and negative plates composing the storage battery.

Claims:—

1. A separating device for the protection of the negative plates of lead storage batteries against the oxidizing products which become disengaged from the positive plates and against the oxygen of the air, comprising a protecting sheath surrounding the negative plates and open at the opposite ends, said sheath consisting of a material which after impregnation by the liquid in which it is immerged is impervious to gases, a partition wall arranged between the protecting sheath and the faces of the negative plates in order to form between the walls of said casing and the plate a free space for the circulation of the electrolyte around said negative plates; means for preventing the admission of the oxygen of the outer air to the upper part of the negative plates and to permit the escaping to the outside of the hydrogen which is discharged on said plate.

2. A separating device for the protection of the negative plates of lead storage batteries against the oxidizing product discharged by the negative plates and against the oxygen of the air, comprising a protecting sheathing surrounding the negative plates and open at the opposite ends, said sheathing consisting of a material which after the impregnation with the liquid in which it is immerged, becomes impervious to gases, a partition wall inserted between the said protecting sheath and the faces of the negative plates to form between the walls of said casing and the plates a free space for the circulation of the electrolyte around said negative plates, a bell adapted to cover the upper part of the casing and the negative plates and immerging into the electrolyte in order to close said bell at the base by a liquid seal and to form in such a manner a protecting means against the admission of the oxygen of the outer air to the negative plate and permitting the escaping of the hydrogen which is formed on said negative plate, to the outside through the liquid seal.

The foregoing of my "separating device for lead storage batteries," signed by me this 7th day of April, 1926.

CHARLES JEAN VICTOR FÉRY.